(12) United States Patent
Chang

(10) Patent No.: US 7,082,526 B2
(45) Date of Patent: Jul. 25, 2006

(54) MECHANISM FOR INTUITIVELY INVOKING ONE OR MORE AUXILIARY PROGRAMS DURING A COMPUTER BOOTING PROCESS

(75) Inventor: Rong-Wen Chang, Fremont, CA (US)

(73) Assignee: Elegent Technologies, Inc., Fremont, CA (US)

( * ) Notice: Subject to any disclaimer, the term of this patent is extended or adjusted under 35 U.S.C. 154(b) by 516 days.

(21) Appl. No.: 10/390,262

(22) Filed: Mar. 14, 2003

(65) Prior Publication Data

US 2004/0181659 A1    Sep. 16, 2004

(51) Int. Cl.
G06F 15/177 (2006.01)
G06F 9/445 (2006.01)
G06F 9/00 (2006.01)

(52) U.S. Cl. .............................. 713/2; 713/1; 713/100
(58) Field of Classification Search .................. None
See application file for complete search history.

(56) References Cited

U.S. PATENT DOCUMENTS

| | | | |
|---|---|---|---|
| 5,230,052 A | 7/1993 | Dayan et al. | |
| 5,245,615 A | 9/1993 | Treu | |
| 5,390,324 A | 2/1995 | Burckhartt et al. | |
| 5,444,850 A | 8/1995 | Chang | |
| 5,455,933 A | 10/1995 | Schieve et al. | |
| 5,572,643 A | 11/1996 | Judson | |
| 5,590,197 A | 12/1996 | Chen et al. | |
| 5,596,711 A | 1/1997 | Burckhartt et al. | |
| 5,732,268 A * | 3/1998 | Bizzarri | 713/2 |
| 5,734,831 A | 3/1998 | Sanders | |
| 5,870,610 A | 2/1999 | Beyda | |
| 5,884,073 A | 3/1999 | Dent | |
| 6,058,430 A | 5/2000 | Kaplan | |
| 6,115,787 A | 9/2000 | Obara | |
| 6,173,438 B1 | 1/2001 | Kodosky et al. | |
| 6,185,609 B1 | 2/2001 | Rangarajan et al. | |

(Continued)

FOREIGN PATENT DOCUMENTS

DE    195 30 095 A1    8/1995

(Continued)

OTHER PUBLICATIONS

"BootMagic User Guide", BootMagic by PowerQuest, 1998, PowerQuest Corporation, pp. 19-21.*

(Continued)

*Primary Examiner*—James K. Trujillo
(74) *Attorney, Agent, or Firm*—Hickman Palermo Truong & Becker, LLP; Christopher J. Brokaw

(57) ABSTRACT

In a computer booting process, a basic input-output system (BIOS) causes one or more auxiliary programs to be automatically executed. By doing so, the BIOS transfers control of the booting process to the auxiliary programs. Thereafter, it is up to the auxiliary programs to determine whether to continue execution, or to proceed with the booting process. Should the auxiliary programs determine that execution of the auxiliary programs should continue, the booting process is halted and the operating system is not loaded or executed. To determine whether execution of the auxiliary programs should continue, the auxiliary programs monitor for any user input. If any user input is received, unless the user input specifically indicates that execution of the auxiliary programs should not continue, the auxiliary programs will continue execution. Thus, the default is to continue execution of the auxiliary programs. This makes invocation of the auxiliary programs much more intuitive, convenient, and seamless for the user than in the prior art.

54 Claims, 5 Drawing Sheets

U.S. PATENT DOCUMENTS

| | | | |
|---|---|---|---|
| 6,327,598 B1 | 12/2001 | Kelley et al. | |
| 6,356,284 B1 | 3/2002 | Manduley et al. | |
| 6,367,074 B1 * | 4/2002 | Bates et al. ............... | 713/2 |
| 6,389,462 B1 | 5/2002 | Cohen et al. | |
| 6,393,585 B1 * | 5/2002 | Houha et al. ............... | 713/1 |
| 6,393,605 B1 | 5/2002 | Loomans | |
| 6,463,531 B1 * | 10/2002 | Aguilar et al. ............. | 713/2 |
| 6,549,773 B1 | 4/2003 | Linden et al. | |
| 2003/0188144 A1 * | 10/2003 | Du et al. ................... | 713/1 |

FOREIGN PATENT DOCUMENTS

| | | |
|---|---|---|
| EP | 0 760 568 A1 | 3/1997 |
| EP | 0 847 008 A2 | 6/1998 |
| GB | 2 318 658 A | 4/1998 |
| WO | WO 97/20281 A1 | 6/1997 |
| WO | WO 97/28499 A1 | 8/1997 |
| WO | WO 00/55769 A2 | 9/2000 |
| WO | 01/01259 A1 | 4/2001 |

OTHER PUBLICATIONS

Chang, Rong-Wen, U.S. Appl. No. 10/882,559, filed Jun. 30, 2004.*

Steve Gold, "NicheView Embedded Systems Web Browser Debuts," Jun. 30, 1999, Newsbytes, pp. 1-2.

Mark Cuban, "Will A $500 PC Work? Of Course!," Jan. 15, 1996, Computer Reseller News, p. 14.

Agranat Systems, Inc., "Agranat Systems and Accelerated Technology Partner to Deliver Industry Leading Embedded Web Server Development Environment," Jul. 20, 1998, PR Newswire, pp. 1-2.

C-Phone Corporation, "C-Phone Corporation Introduces TV Set-Top Device for Internet Access," May 13, 1998, pp. 1-2.

Gale Group, "Desktop Computing in a Non-PC Age," Electronic Engineering News, Mar. 22, 1999, pp. 1-2.

* cited by examiner

MECHANISM FOR INTUITIVELY INVOKING ONE OR MORE AUXILIARY PROGRAMS DURING A COMPUTER BOOTING PROCESS

FIELD OF THE INVENTION

This invention relates generally to computing technology, and more particularly to a mechanism for intuitively invoking one or more auxiliary programs during a computer booting process.

BACKGROUND

In a typical personal computer, there exists a processor, a basic input-output system (BIOS), a main memory, and a hard drive that stores an operating system and one or more application programs. The BIOS usually takes the form of executable instructions stored on a read-only memory (ROM). During a regular boot-up process, the processor accesses and executes the instructions in the BIOS, and under direction of the BIOS, the processor implements the booting process. The BIOS causes the processor to perform some low-level setup functions to prepare the computer for regular operation. After the setup functions are performed, the BIOS causes the processor to load and execute the operating system stored on the hard drive. By doing so, the BIOS in effect transfers control from itself to the operating system. After the operating system is loaded and executed by the processor, the boot-up process is complete and the computer is ready for operation. As this discussion shows, in a typical personal computer, the BIOS controls the booting process.

The ROM on which the BIOS resides (referred to hereinafter as the BIOS ROM) is typically quite small in size. Despite this small size, however, it has been observed that one or more auxiliary programs may be stored on the BIOS ROM. These auxiliary programs may be executed during the booting process prior to and even in lieu of the operating system on the hard drive to provide certain desired functionalities. An example of an auxiliary program is the self-contained browser disclosed in U.S. patent application Ser. No. 09/449,065 entitled "Self Contained Browser Architecture" filed on Nov. 24, 1999, the contents of which are incorporated herein by this reference. Auxiliary programs are generally self-contained, meaning that they comprise all of the components that they need to operate. As a result, they do not need the operating system on the hard drive to function. This can be quite advantageous because even if the hard drive fails or the operating system becomes corrupted, the auxiliary programs are not affected. They can still function. Hence, the auxiliary programs are impervious to many system failures.

Despite their advantages, auxiliary programs have suffered thus far from one major drawback, which is that they are difficult and non-intuitive to invoke. Because they are executed during the booting process, auxiliary programs have thus far been invoked via the BIOS. Unfortunately, invoking a program via the BIOS is not an intuitive process.

Two methods are currently implemented to invoke an auxiliary program via a BIOS. The first method involves manually adjusting the settings of the BIOS to cause the BIOS to invoke the auxiliary program. To do so, a user depresses a special key (e.g. the F1 key) at the beginning of the booting process to enter BIOS setup mode. Once in this mode, the user updates the necessary settings to cause the BIOS to invoke the auxiliary program. After the settings are updated, the user reboots the computer, and during the subsequent booting process, the BIOS causes the auxiliary program to be executed. If the user thereafter wishes to terminate execution of the auxiliary program, and to execute the operating system on the hard drive, the user has to reboot the computer. At the beginning of the subsequent booting process, the user depresses the special key to once again enter BIOS setup mode. While in this mode, the user updates the necessary settings to cause the BIOS to no longer invoke the auxiliary program. Thereafter, the user reboots the computer again, and during the subsequent booting process, the BIOS will bypass execution of the auxiliary program and proceed to executing the operating system. The problem with this approach is that it requires significant technical knowledge on the part of the user. Many computer users lack such knowledge and sophistication; thus, they cannot take advantage of the auxiliary program.

A second method involves the use of a "hot key". During the booting process, if a user depresses a specific key recognized by the BIOS as a command to execute the auxiliary program, then the BIOS will cause the processor to execute the auxiliary program. Otherwise, the BIOS will cause the processor to continue with the booting process by loading and executing the operating system. If the auxiliary program is executed, and the user subsequently wishes to execute the operating system, the user has to reboot the computer. During the subsequent booting process, the user foregoes depressing the hot key, which causes the BIOS to load and execute the operating system. While not as burdensome as the first approach, the "hot key" approach is still not very intuitive or convenient. It requires the user to know which key is the hot key. It also requires the user to understand the significance of depressing the hot key (i.e. that it stops the booting process). As noted above, many computer users lack this level of sophistication. As a result, they may not know how to, or they may choose not to invoke the auxiliary program to avoid any additional complication. In either case, the advantages offered by the auxiliary program are not exploited.

As shown by the above discussion, the current mechanisms for invoking auxiliary programs during a booting process leave much to be desired. As a result, an improved mechanism is needed.

SUMMARY

In accordance with one embodiment of the present invention, there is provided a mechanism in which, during a booting process, the BIOS causes one or more auxiliary programs to be automatically executed. By doing so, the BIOS transfers control of the booting process to the auxiliary programs. Thereafter, it is up to the auxiliary programs to determine whether to continue execution, or to proceed with the booting process. Should the auxiliary programs determine that execution of the auxiliary programs should continue, the booting process is halted and the operating system is not loaded or executed.

In one embodiment, to determine whether execution of the auxiliary programs should continue, the auxiliary programs do not monitor for a "hot key" that indicates execution should continue. Instead, they do the converse. The auxiliary programs monitor for any user input. If any user input is received, unless the user input indicates specifically that execution of the auxiliary programs should not continue, the auxiliary programs will continue execution. Thus, in this embodiment, the default is to continue execution of the auxiliary programs. This makes invocation of the auxiliary programs much more intuitive and convenient for the user. In one embodiment, if no user input is received within a certain period of time, the auxiliary programs will determine that the booting process should continue.

In the event the auxiliary programs determine that the booting process should continue, the auxiliary programs terminate execution, and cause control to be transferred to the operating system to allow the operating system to load and execute. In one embodiment, in doing so, the auxiliary programs do not require the computer to be rebooted. As a result, the booting process appears to be a smooth, continuous one to the user. This is so despite the fact that execution of the auxiliary programs is inserted into the process. Thus, this embodiment of the present invention makes invocation of auxiliary programs more intuitive and convenient without unduly disrupting the overall booting process.

DETAILED DESCRIPTION OF EMBODIMENT(S)

Computer Overview

Figure 1:
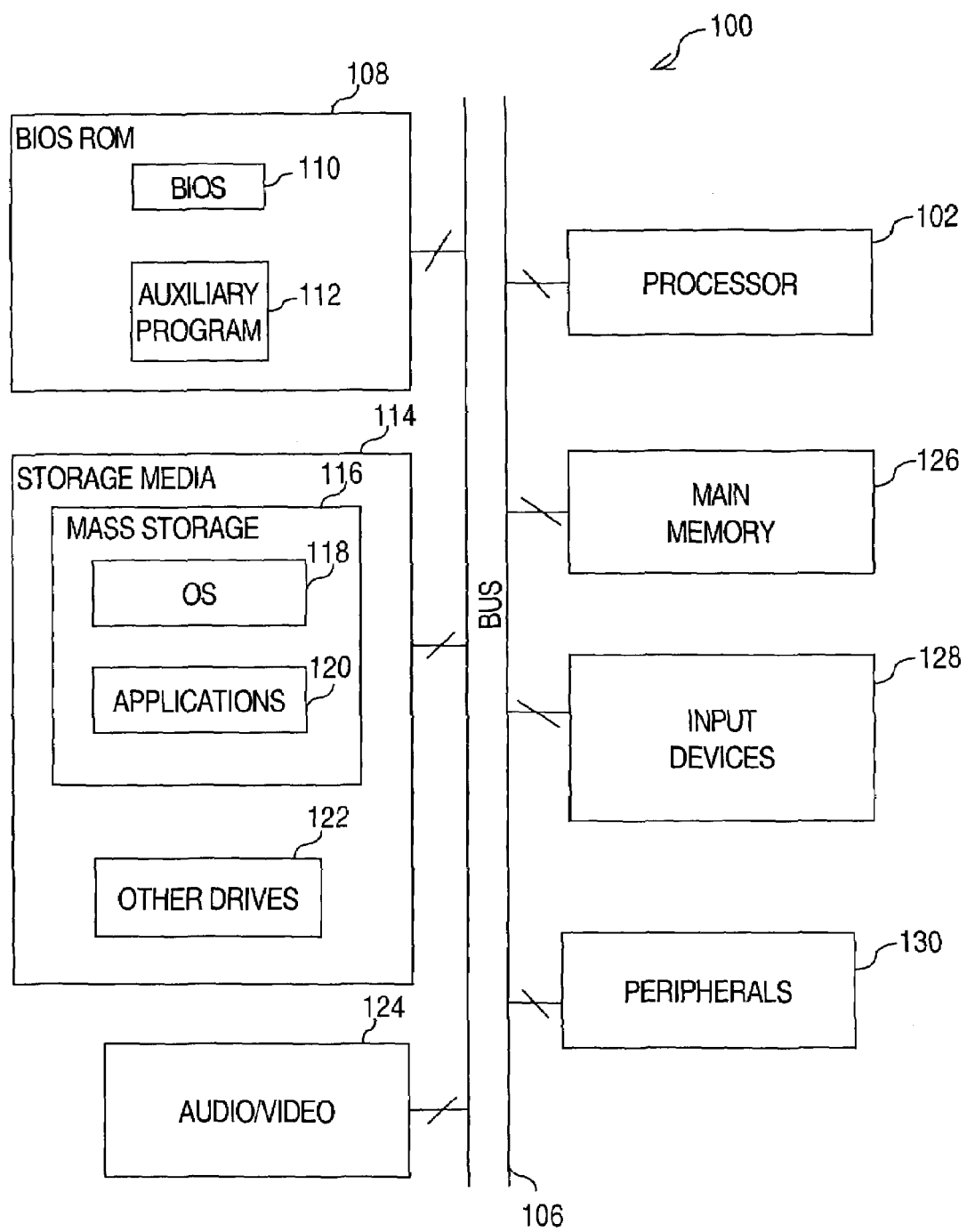
FIG. 1 is a block diagram of a computer in which one embodiment of the present invention may be implemented.

With reference to FIG. 1, there is shown a block diagram of a computer 100 in which one embodiment of the present invention may be implemented. As shown, computer 100 comprises a processor 102. Processor 102 is responsible for executing instructions to provide the overall functionality of the computer 100. For purposes of the present invention, processor 102 may be any type of processor made by any manufacturer capable of executing any type of computer instructions. For the sake of simplicity, only one processor 102 is shown in FIG. 1; however, it should be noted that computer 100 may comprise more than one processor 102, if so desired.

The processor 102 is coupled to a bus 106. Bus 106 enables the processor 102 to communicate with the other components in the computer 100. For purposes of the present invention, bus 106 may be any bus capable of facilitating the exchange of information between a plurality of components.

Coupled to the bus is a main memory 126. Main memory 126 is used by the processor 102 to store instructions while the processor 102 is executing the instructions. In addition to storing instructions, main memory may also be used to store data and other information generated during the execution of instructions.

Computer 100 further comprises a BIOS ROM 108 (note: BIOS ROM 108 is shown as a read-only-memory (ROM) for illustrative purposes only; for purposes of the present invention, BIOS ROM 108 may take the form of any computer-readable medium). As shown, BIOS ROM 108 comprises a basic input-output system (BIOS) 110. In one embodiment, BIOS 110 takes the form of a set of computer instructions that are executed by processor 102 during a booting process. BIOS 110 comprises instructions for causing processor 102 to implement standard BIOS functionality (e.g. perform basic setup functions). In one embodiment, BIOS 110 further comprises one or more instructions for causing the processor 102 to execute one or more auxiliary programs 112 during the booting process. More will be said about this in a later section.

In one embodiment, BIOS ROM 108 further comprises one or more auxiliary programs 112. For the sake of simplicity, only one auxiliary program 112 is shown in FIG. 1; however, it should be noted that BIOS ROM 108 may comprises multiple auxiliary programs, if so desired. As used herein, the term auxiliary program refers broadly to any program that is executed during a booting process prior to the loading and execution of a general-purpose operating system 118 of the computer 100. An auxiliary program 112 may provide any type of desired functionality. Examples of auxiliary program functionalities include but are not limited to browser functionality, media player functionality (e.g. CD player, DVD player, MP3 player, etc.), and TV tuner functionality. In one embodiment, an auxiliary program 112 is a self-contained program, which means that it comprises all of the components that it needs to operate. For example, an auxiliary program 112 may comprise its own operating system kernel and device drivers. As a result, an auxiliary program 112 does not need the general-purpose operating system 118 of the computer 100 to operate. The functionality of the auxiliary program 112 will be described in greater detail in a later section. For illustrative purposes, auxiliary program 112 is shown in FIG. 1 as residing on the BIOS ROM 108. However, it should be noted that this is not required. If so desired, auxiliary program 112 may reside on a separate storage medium (not shown). So long as that storage medium can be accessed during the booting process, the auxiliary program 112 may reside thereon.

Computer 100 further comprises one or more storage media 114. In one embodiment, storage media 114 include a mass storage magnetic hard drive 116 on which an operating system 118 and one or more applications 120 are stored. For purposes of the present invention, operating system 118 may be any operating system, including but not limited to Windows, Unix, MacOS, Linux, etc., that is capable of providing a platform on which other applications are executed. In computer 100, operating system 118 is the general-purpose operating system that is loaded and executed during a regular booting process. For illustrative purposes, mass storage 116 has been described as a magnetic hard drive. However, it should be noted that for purposes of the present invention, mass storage 116 may take the form of any computer-readable medium.

Storage media 114 may further comprise one or more other drives 122, such as a floppy drive, a CD-ROM drive, a DVD drive, a CD-RW drive, etc. These additional drives enable the computer to read from and write to other storage media. In one embodiment, all of the drives 116, 122 are accessed via a common controller interface, such as an IDE interface (not shown). In the embodiment shown, storage media 114 are shown as drives. However, it should be noted that storage media 114 need not be drives but rather may take on other forms, for example, disk-on-chip modules, flash memory, etc. All possible forms are within the scope of the present invention.

Computer 100 further comprises components for enabling a user to interface with the computer 100, including audio/video components 124 and input devices 128. The audio/video components 124 may include, for example, a video card, a video display, an audio card, and a set of speakers. These components 124 enable the computer 100 to provide information to a user. The input devices 128 enable the user to provide information to the computer 100. The input devices 128 may include, for example, a keyboard, an infrared receiver for receiving infrared signals (such as signals from a remote control), and a cursor control device such as a mouse, a trackball, a remote-controlled pointing device, etc. Basically, anything that enables the computer 100 to interface with a user can be included as components 124 and 128.

In addition to the components mentioned above, the computer 100 may further comprise other peripherals 130, such as printers, scanners, network cards, etc. These peripherals 130 may interface with the computer 100 via various ports and interfaces, such as parallel ports, serial ports, USB ports, SCSI interfaces, etc. Generally, any device that is capable of interfacing with the computer 100 can be included as one of the peripherals 130.

Sample Operation

Operational Overview

Figure 2:
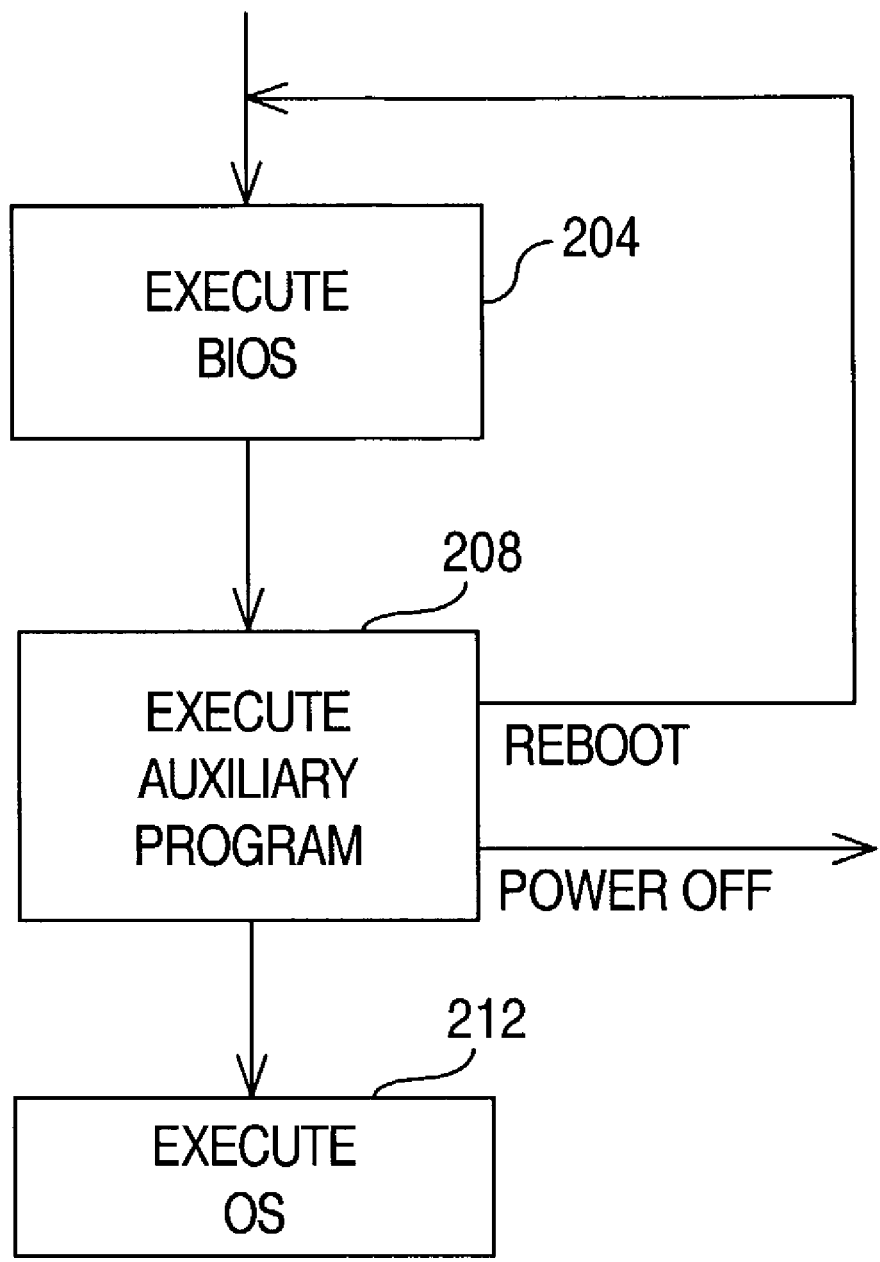
FIG. 2 is a flow diagram showing an operational overview of the computer of FIG. 1 during a booting process, in accordance with one embodiment of the present invention.

With reference to FIG. 2, there is shown an operational overview of the computer 100 during a booting process. Upon power up of the computer 100, or a reboot of the computer 100, processor 102 initially executes (block 204) the instructions in the BIOS 110. After the BIOS instructions 110 are executed, control is transferred to auxiliary program 112; that is, processor 102 executes (block 208) the instructions in the auxiliary program 112. Once the auxiliary program 112 is executed, there are four possible scenarios: (1) the auxiliary program 112 continues executing such that the OS 118 is never loaded and executed; (2) the computer 100 is rebooted, which causes the processor 102 to execute the BIOS 110 again; (3) the computer is powered off; or (4) the auxiliary program 112 is terminated, and the OS 118 is loaded and executed (block 212) by the processor 102. In one embodiment, if the auxiliary program 112 is terminated, and the OS 118 is loaded and executed, the computer 100 does not need to be rebooted. Instead, control is transferred from the auxiliary program 112 to the OS 118 seamlessly. Because of this, the booting process appears to a user as a seamless, continuous process. This is so despite the fact that execution of the auxiliary program 112 was inserted into the process. By making the booting process a seamless one, this embodiment of the present invention makes the invocation of the auxiliary program 112 much more intuitive and convenient.

Detailed Operation

Figure 3:
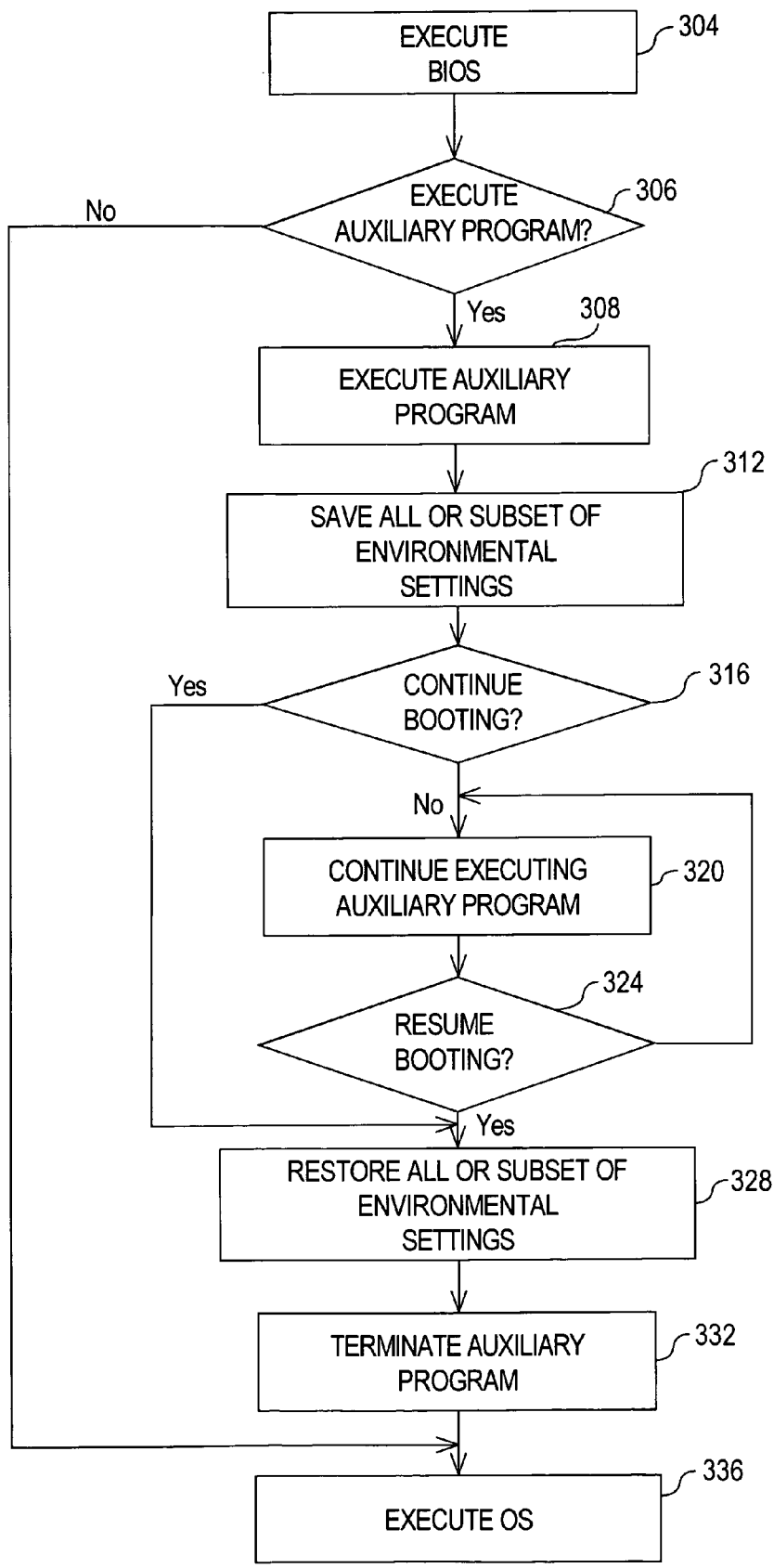
FIG. 3 is a flow diagram showing, in greater detail, the operation of the computer of FIG. 1 during a booting process, in accordance with one embodiment of the present invention.

With reference to FIG. 3, the operation of computer 100 during a booting process will now be described in greater detail.

When a user powers up the computer 100, or initiates a reboot of the computer 100, the processor 102 initiates a booting process. To do so, the processor 102 accesses and executes (block 304) the computer instructions contained in the BIOS 110. Under control of the BIOS 110, the processor 102 performs some basic setup operations to prepare the various components in the computer 100 for operation. These basic setup operations are known in the art and thus, will not be elaborated upon herein. After the basic setup operations are performed, the BIOS 110 causes the processor 102 to determine (block 306) whether to execute the auxiliary program 112. This may be carried out, for example, by checking one or more of the BIOS settings. If the settings indicate that the auxiliary program 112 is not to be executed, then BIOS 110 causes processor 102 to proceed to block 336 to execute the OS 118. On the other hand, if the settings indicate that the auxiliary program 112 is to be executed, then BIOS 110 causes the processor 102 to execute (block 308) the auxiliary program 112. By doing so, the BIOS 110 transfers control to the auxiliary program 112 to allow the auxiliary program 112 to control the rest of the booting process. Once the auxiliary program 112 is executed, the BIOS 110 no longer has any control over the booting process. Thereafter, it is the responsibility of the auxiliary program 112 to determine whether to continue booting.

In one embodiment, before the auxiliary program 112 makes this determination, it first saves (block 312) a set of environmental settings that define the current operating environment of the computer 100. In one embodiment, this involves saving information that defines the current state of the processor 102, the memory 126, the audio/video components 124; the network (if any); the input devices 128 (e.g. keyboard, mouse, etc.), the peripherals 130, the drives 116, 122, the controller for controlling the drives (e.g. IDE controller), the external ports (e.g. USB, serial, parallel, etc.), the core logic, and the super I/O. Basically, any value associated with any component or interface that contributes to defining the current operating environment of the computer 100 is saved. By saving these settings, it is possible to restore the current operating environment at a later time. The significance of this will be elaborated upon in a later section.

Figure 4:
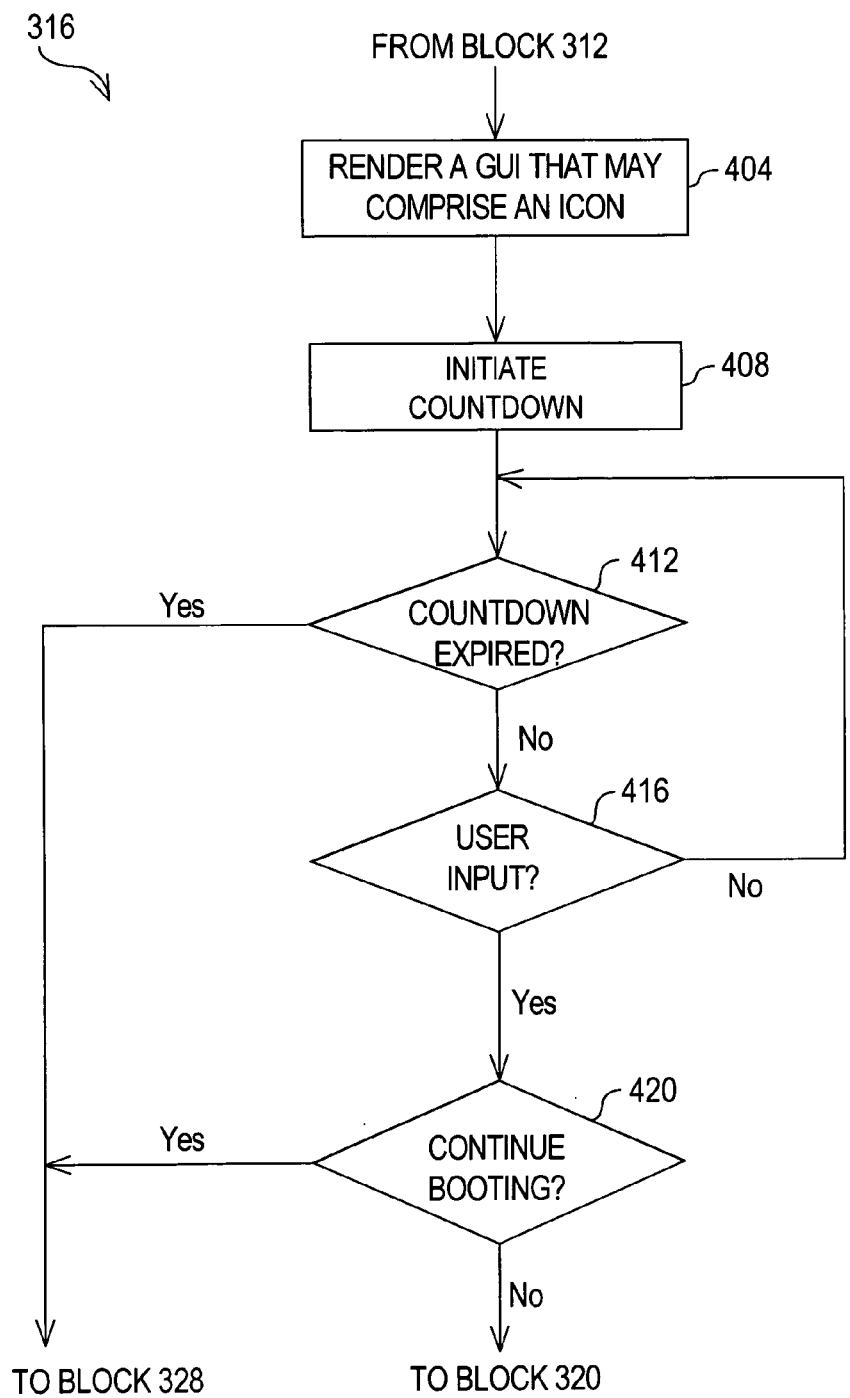
FIG. 4 is a flow diagram showing, in greater detail, the operation of block 316 of FIG. 3.

After the environmental settings are saved, the auxiliary program 112 causes the processor 102 to determine (block 316) whether to continue the booting process. This determination can be made in many different ways. In one embodiment, the determination (block 316) is made in accordance with the flow diagram shown in FIG. 4 (i.e. FIG. 4 is a more detailed depiction of block 316).

Specifically, the auxiliary program 112 causes the processor 102 to generate and render (block 404) a graphical user interface (GUI) to the user, and then to initiate a countdown (block 408). This countdown may be for any desired period (e.g. 10 seconds). The GUI may display the countdown to the user (such a countdown has a tendency to evoke/solicit action from the user). The GUI may also comprise graphical representations (e.g. icons) of the functions/capabilities that are offered by the auxiliary program 112 (e.g. a browser icon, a media player icon, a TV tuner icon, etc.). This also has a tendency to evoke/solicit action from the user in that it may cause the user to select one or more of the icons. In addition, the GUI may comprise a message or graphical representation indicating that the user can instruct the computer 100 to continue with the booting process (e.g. a message stating "Press the ESC key to continue booting", or an icon of an operating system, indicating that the user can select the icon to continue the booting process by executing the operating system). Since the auxiliary program 112 is in control, it can cause the processor 102 to display any information it wishes to the user. After the GUI is presented to the user, the processor 102 monitors for user input.

In monitoring for user input, the processor 102 enters a loop. It first checks (block 412) the countdown to determine whether it has expired. If not, the processor 102 checks (block 416) for user input. If no user input is detected, the processor 102 loops back to block 412 to check the countdown again. This continues until either the countdown has expired, or some user input has been detected. If no user input is detected by the time the countdown period expires, the auxiliary program 112 proceeds to block 328 (FIG. 3) to continue with the booting process.

On the other hand, if any user input is detected (for example, a key on the keyboard is depressed, a mouse is moved, a remote control signal is received, etc.), the processor 102 determines 420 whether the user input specifically indicates that the booting process should continue. For example, the processor 102 determines whether the user has pushed a specific key, such as the Esc key, to indicate that the booting process should continue, or the user has selected the operating system icon. Only if the user input specifically indicates that booting should continue will the auxiliary program 112 continue with the booting process by going to block 328. In response to any other user input, the auxiliary program 112 will continue its own execution by proceeding to block 320, and will halt the booting process such that the operating system 118 on the hard drive 116 is not loaded or executed. As an alternative, block 420 may be eliminated such that in response to any user input, the booting process is halted and the processor 102 proceeds to block 320.

Notice that the above-described operation is the converse of the prior art "hot key" implementation. Whereas the default of the prior art was to continue with the booting process unless the user hit a "hot key" to invoke the auxiliary program, the default of the auxiliary program 112 is to continue its own execution. Unless the user input specifically indicates that booting should continue, the auxiliary program 112 will continue its own execution and will halt the booting process. By making continued execution of the auxiliary program 112 the default, invocation of the auxiliary program 112 is made much more intuitive and convenient.

Returning to FIG. 3, if the auxiliary program 112 determines that booting should continue, the auxiliary program 112 causes the processor 102 to proceed to block 328 to restore the environmental settings that were previously saved. Doing so restores the computer 100 to the environment that existed at the point the auxiliary program 112 began executing. Thus, from the point of view of the computer's environment, it is as if the auxiliary program 112 never executed. Thereafter, the auxiliary program 112 terminates (block 332) its own execution, and causes the processor 102 to load and execute (block 336) the operating system 118 on the hard drive 116 to complete the booting process. Control is thus transferred from the auxiliary program 112 to the operating system 118. Because the environmental settings are restored prior to the loading and execution of the operating system 118, this transfer of control to the operating system 118 is achieved without rebooting the computer 100. Thus, the whole booting process appears to be a smooth, continuous, and seamless one to the user.

Returning to block 316, if the auxiliary program 112 determines that the booting process should not continue, it causes the processor 102 to proceed to block 320 to continue executing the auxiliary program 112. In block 320, any function of the auxiliary program 112 may be invoked. This includes for example invoking the browser function to browse the Internet, invoking the media player function to play a musical CD or a DVD, invoking the TV tuner function to switch channels, etc.

While executing, the auxiliary program 112 causes the processor 102 to continually monitor for user input. Whenever any user input is detected, a determination is made (block 324) as to whether that user input indicates that the booting process should be resumed. For example, the processor 102 may check to see if a specific key (e.g. the Esc key) is depressed, or a specific icon (e.g. an operating system icon) is selected. If not, the processor 102 loops back to block 320 to continue executing the auxiliary program 112. However, if the processor 102 determines that the booting process should be resumed, then the processor 102 proceeds to block 328.

At block 328, the auxiliary program 112 causes the processor 102 to restore the environmental settings that were previously saved. Thereafter, the auxiliary program 112 terminates (block 332) its own execution, and causes the processor 102 to load and execute (block 336) the operating system 118 on the hard drive 116 to complete the booting process. Control is thus transferred from the auxiliary program 112 to the operating system 118. As noted previously, because the environmental settings are restored prior to the loading and execution of the operating system 118, transfer of control to the operating system 118 is achieved without rebooting the computer 100. Hence, the resumption of the booting process is implemented smoothly and seamlessly.

Alternative Embodiment

Thus far, the auxiliary program 112 has been described as the component that saves and restores all of the environment settings of the computer 100. As an alternative, the BIOS 110 may aid in this operation such that the BIOS 110 saves and restores some of the environment settings, while the auxiliary program 112 saves and restores the others. This embodiment may be advantageous in that it takes further advantage of the capabilities of the BIOS 110. If the BIOS 110 already comprises code for saving some environmental settings, then that code can be exploited and does not need to be reproduced in the auxiliary program 112. Hence, the auxiliary program 112 can be made even smaller.

Figure 5:
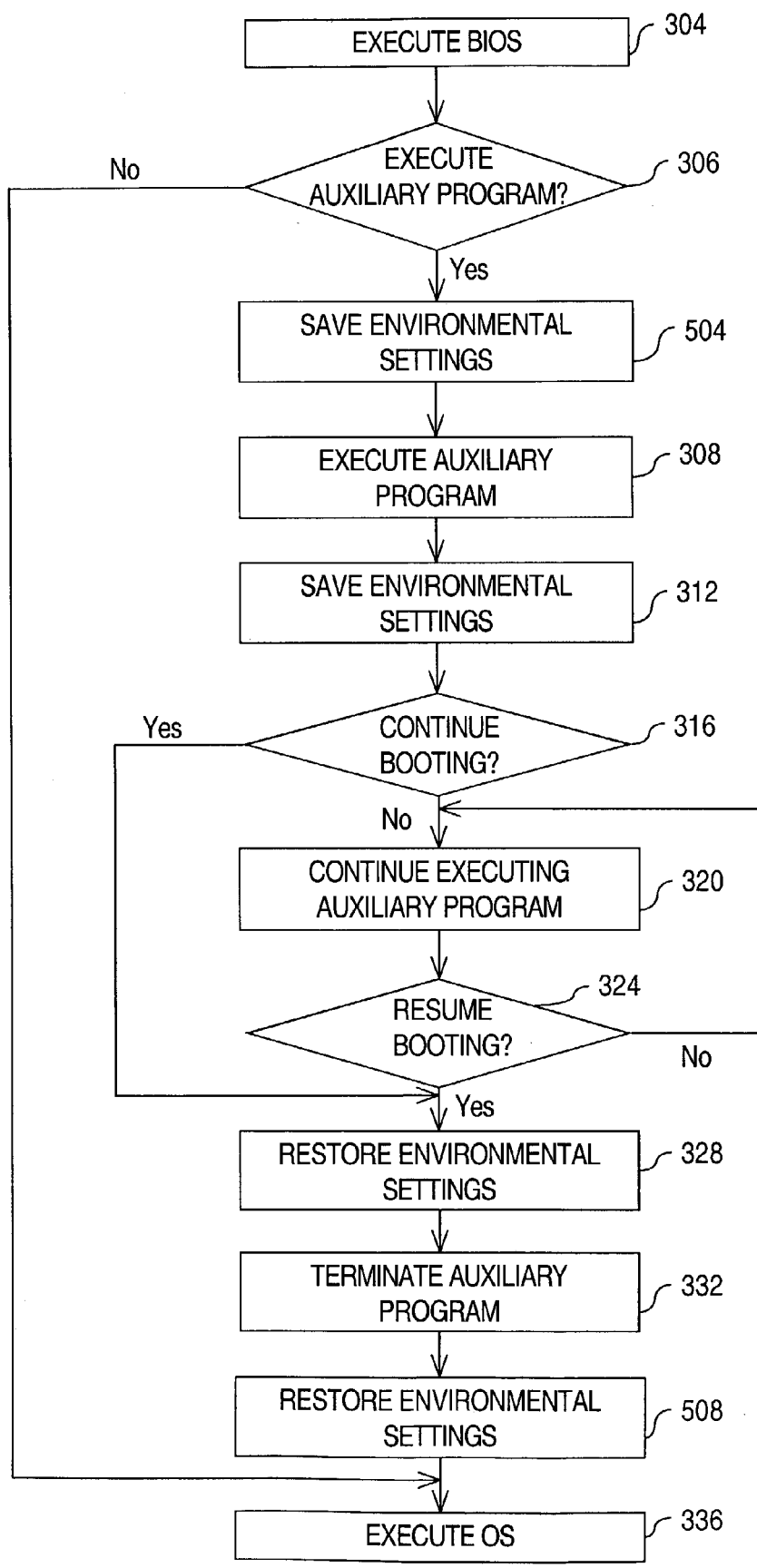
FIG. 5 is a flow diagram showing the operation of the computer of FIG. 1 during a booting process, in accordance with an alternate embodiment of the present invention.

FIG. 5 shows an operational flow diagram for a booting process in which the BIOS 110 saves and restores some of the environmental settings. This flow diagram is substantially similar to the flow diagram of FIG. 3, except that this flow diagram comprises two additional blocks: 504 and 508. The significance of these additional blocks will now be described.

Basically, when BIOS 110 determines in block 306 that the auxiliary program 112 should be executed, it does not immediately transfer control to the auxiliary program 112. Instead, it first saves in block 504 a subset of the environmental settings. After that is done, BIOS 110 passes control to the auxiliary program 112. After the auxiliary program 112 executes in block 308, it saves the rest of the environmental settings in block 312. Thereafter, the auxiliary program 112 continues execution.

When it comes time to resume booting, the auxiliary program 112 restores in block 328 the environmental settings that it saved in block 312. Thereafter, the auxiliary program 112 terminates operation in block 332. However, unlike the flow diagram of FIG. 3, the auxiliary program 112 does not transfer control to the OS 118; rather, it transfers control back to the BIOS 110. In response, the BIOS 110 restores in block 508 the environmental settings that it saved in block 504. After that is done, the environment of the computer 100 is completely restored. At that point, the BIOS 110 causes the OS 118 to be executed. Because the environmental settings were completely restored prior to executing the OS 118, the OS 118 can be executed without having to reboot the computer 100. In this manner, the BIOS 110 aids in the environmental setting saving process.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. In a computer comprising a basic input-output system (BIOS), one or more auxiliary programs, and an operating system separate from the one or more auxiliary programs, a method for booting the computer, comprising:

executing the BIOS;

executing one or more of the auxiliary programs, wherein control is transferred from the BIOS to one or more of the auxiliary programs;

saving, by the one or more of the auxiliary programs, a set of environmental settings that define a current environment for the computer;

determining by the one or more of the auxiliary programs whether to continue booting the computer;

in response to a determination not to continue booting the computer, continuing to execute the one or more of the auxiliary programs without executing the operating system;

in response to a determination to continue booting the computer, performing the steps of:

(a) restoring, by the one or more of the auxiliary programs, the set of environmental settings;

(b) terminating execution of the one or more auxiliary programs; and (c) executing the operating system, wherein control is transferred from the one or more auxiliary programs to the operating system without rebooting the computer.

2. The method of claim 1, wherein determining comprises:

initiating a countdown;

monitoring for user input; and if any user input is detected prior to expiration of the countdown, concluding that booting of the computer should not continue.

3. The method of claim 2, wherein determining further comprises:

if no user input is detected prior to expiration of the countdown, concluding that booting of the computer should continue.

4. The method of claim 2, wherein determining further comprises:

rendering a graphical user interface (GUI) to a user to solicit input from the user.

5. The method of claim 4, wherein the GUI comprises a graphical representation that the user can select to specifically indicate that booting of the computer should continue.

6. The method of claim 5, wherein the graphical representation comprises an icon.

7. The method of claim 4, wherein the GUI comprises a graphical representation that the user can select to invoke a functionality provided by the one or more auxiliary programs.

8. The method of claim 7, wherein the graphical representation comprises an icon.

9. The method of claim 4, wherein the GUI comprises a display of the countdown.

10. The method of claim 1, wherein determining whether to continue booting the computer comprises:

initiating a countdown;

monitoring for user input;

if any user input is detected prior to expiration of the countdown, determining whether the user input specifically indicates that booting of the computer should continue; and unless the user input specifically indicates that booting of the computer should continue, concluding that booting of the computer should not continue.

11. The method of claim 10, wherein determining whether to continue booting the computer further comprises:

if no user input is detected prior to expiration of the countdown, concluding that booting of the computer should continue.

12. The method of claim 10, wherein determining whether to continue booting the computer further comprises:

rendering a graphical user interface (GUI) to a user to solicit input from the user.

13. The method of claim 12, wherein the GUI comprises a graphical representation that the user can select to specifically indicate that booting of the computer should continue.

14. The method of claim 13, wherein the graphical representation comprises an icon.

15. The method of claim 12, wherein the GUI comprises a graphical representation that the user can select to invoke a functionality provided by the one or more auxiliary programs.

16. The method of claim 15, wherein the graphical representation comprises an icon.

17. The method of claim 12, wherein the GUI comprises a display of the countdown.

18. A computer, comprising:

one or more processors;

a basic input-output system (BIOS):

one or more auxiliary programs;

an operating system separate from the one or more auxiliary programs, wherein the BIOS comprises:

one or more instructions for causing the one or more processors to execute, during a booting process, one or more of the auxiliary programs, thereby causing control to be transferred from the BIOS to one or more of the auxiliary programs without rebooting the computer, and wherein the one or more auxiliary programs comprise:

(a) one or more instructions for causing the one or more processors to save a set of environmental settings that define a current environment for the computer;

(b) one or more instructions for causing the one or more processors to determine whether to continue the booting process;

(c) one or more instructions for causing the one or more processors to continue executing the one or more of the auxiliary programs without executing the operating system, in response to a determination not to continue the booting process;

(d) one or more instructions for causing the one or more processors to restore the set of environment settings; and (e) one or more instructions for causing the one or more processors to execute the operating system, thereby causing control to be transferred from the one or more auxiliary programs to the operating system without rebooting the computer.

19. The computer of claim 18, wherein the one or more instructions for causing the one or more processors to determine whether to continue the booting process comprises:
one or more instructions for causing the one or more processors to initiate a countdown;
one or more instructions for causing the one or more processors to monitor for user input; and
one or more instructions for causing the one or more processors to conclude that booting of the computer should not continue, if any user input is detected prior to expiration of the countdown.

20. The computer of claim 19, wherein the one or more instructions for causing the one or more processors to determine whether to continue the booting process further comprises:
one or more instructions for causing the one or more processors to conclude that booting of the computer should continue, if no user input is detected prior to expiration of the countdown.

21. The computer of claim 19, wherein the one or more instructions for causing the one or more processors to determine whether to continue the booting process further comprises:
one or more instructions for causing the one or more processors to render a graphical user interface (GUI) to a user to solicit input from the user.

22. The computer of claim 21, wherein the GUI comprises a graphical representation that the user can select to specifically indicate that the booting process should continue.

23. The computer of claim 22, wherein the graphical representation comprises an icon.

24. The computer of claim 21, wherein the GUI comprises a graphical representation that the user can select to invoke a functionality provided by the one or more auxiliary programs.

25. The computer of claim 24, wherein the graphical representation comprises an icon.

26. The computer of claim 21, wherein the GUI comprises a display of the countdown.

27. The computer of claim 18, wherein the one or more instructions for causing the one or more processors to determine whether to continue the booting process comprises:
one or more instructions for causing the one or more processors to initiate a countdown;
one or more instructions for causing the one or more processors to monitor for user input;
one or more instructions for causing the one or more processors to determine, if any user input is detected prior to expiration of the countdown, whether the user input specifically indicates that the booting process should continue; and
one or more instructions for causing the one or more processors to conclude that the booting process should not continue, unless the user input specifically indicates that the booting process should continue.

28. The computer of claim 27, wherein the one or more instructions for causing the one or more processors to determine whether to continue the booting process further comprises:
one or more instructions for causing the one or more processors to conclude, if no user input is detected prior to expiration of the countdown, that the booting process should continue.

29. The computer of claim 27, wherein the one or more instructions for causing the one or more processors to determine whether to continue the booting process further comprises:
one or more instructions for causing the one or more processors to render a graphical user interface (GUI) to a user to solicit input from the user.

30. The computer of claim 29, wherein the GUI comprises a graphical representation that the user can select to specifically indicate that the booting process should continue.

31. The computer of claim 30, wherein the graphical representation comprises an icon.

32. The computer of claim 29, wherein the GUI comprises a graphical representation that the user can select to invoke a functionality provided by the one or more auxiliary programs.

33. The computer of claim 32, wherein the graphical representation comprises an icon.

34. The computer of claim 29, wherein the GUI comprises a display of the countdown.

35. A computer readable medium, comprising:
a basic input-output system (BIOS); and
one or more auxiliary programs,
wherein the BIOS comprises:
one or more instructions for causing one or more processors to execute, during a booting process, one or more of the auxiliary programs, thereby causing control to be transferred from the BIOS to one or more of the auxiliary programs without rebooting, and
wherein the one or more auxiliary programs comprise:
(a) one or more instructions for causing the one or more processors to save a set of environmental settings that define a current environment for a computer;
(b) one or more instructions for causing the one or more processors to determine whether to continue the booting process;
(c) one or more instructions for causing the one or more processors to continue executing the one or more of the auxiliary programs without executing an operating system separate from the one or more auxiliary programs, in response to a determination not to continue the booting process;
(d) one or more instructions for causing the one or more processors to restore the set of environment settings; and
(e) one or more instructions for causing the one or more processors to execute the operating system separate from the one or more auxiliary programs, thereby causing control to be transferred from the one or more auxiliary programs to the operating system without rebooting.

36. The computer readable medium of claim 35, wherein the one or more instructions for causing one or more processors to determine whether to continue the booting process comprises:
one or more instructions for causing one or more processors to initiate a countdown;
one or more instructions for causing one or more processors to monitor for user input; and
one or more instructions for causing one or more processors to conclude that the booting process should not continue, if any user input is detected prior to expiration of the countdown.

37. The computer readable medium of claim 36, wherein the one or more instructions for causing one or more processors to determine whether to continue the booting process further comprises:
one or more instructions for causing one or more processors to conclude, if no user input is detected prior to expiration of the countdown, that the booting process should continue.

38. The computer readable medium of claim 36, wherein the one or more instructions for causing one or more processors to determine whether to continue the booting process further comprises:
one or more instructions for causing one or more processors to render a graphical user interface (GUI) to a user to solicit input from the user.

39. The computer readable medium of claim 38, wherein the GUI comprises a graphical representation that the user can select to specifically indicate that the booting process should continue.

40. The computer readable medium of claim 39, wherein the graphical representation comprises an icon.

41. The computer readable medium of claim 38, wherein the GUI comprises a graphical representation that the user can select to invoke a functionality provided by the one or more auxiliary programs.

42. The computer readable medium of claim 41, wherein the graphical representation comprises an icon.

43. The computer readable medium of claim 38, wherein the GUI comprises a display of the countdown.

44. The computer readable medium of claim 35, wherein the one or more instructions for causing one or more processors to determine whether to continue the booting process comprises:
one or more instructions for causing one or more processors to initiate a countdown;
one or more instructions for causing one or more processors to monitor for user input;
one or more instructions for causing one or more processors to determine, if any user input is detected prior to expiration of the countdown, whether the user input specifically indicates that the booting process should continue; and
one or more instructions for causing one or more processors to conclude that the booting process should not continue, unless the user input specifically indicates that the booting process should continue.

45. The computer readable medium of claim 44, wherein the one or more instructions for causing one or more processors to determine whether to continue the booting process further comprises:
one or more instructions for causing one or more processors to conclude, if no user input is detected prior to expiration of the countdown, that the booting process should continue.

46. The computer readable medium of claim 44, wherein the one or more instructions for causing one or more processors to determine whether to continue the booting process further comprises:
one or more instructions for causing one or more processors to render a graphical user interface (GUI) to a user to solicit input from the user.

47. The computer readable medium of claim 46, wherein the GUI comprises a graphical representation that the user can select to specifically indicate that the booting process should continue.

48. The computer readable medium of claim 47, wherein the graphical representation comprises an icon.

49. The computer readable medium of claim 46, wherein the GUI comprises a graphical representation that the user can select to invoke a functionality provided by the one or more auxiliary programs.

50. The computer readable medium of claim 49, wherein the graphical representation comprises an icon.

51. The computer readable medium of claim 46, wherein the GUI comprises a display of the countdown.

52. In a computer comprising a basic input-output system (BIOS), one or more auxiliary programs, and an operating system separate from the one or more auxiliary programs, a method for booting the computer, comprising:
executing the BIOS;
saving, by the BIOS, a subset of a set of environmental settings, wherein the environmental settings define a current environment for the computer;
executing one or more of the auxiliary programs, wherein control is transferred from the BIOS to one or more of the auxiliary programs;
saving, by one or more of the auxiliary programs, a remainder of the set of environmental settings;
restoring, by one or more of the auxiliary programs, the remainder of the set of environmental settings;
executing the BIOS, wherein control is transferred from the one or more auxiliary programs to the BIOS;
restoring, by the BIOS, the subset of the set of environmental settings; and
executing the operating system, wherein control is transferred from the BIOS to the operating system.

53. A computer, comprising:
one or more processors;
a basic input-output system (BIOS);
one or more auxiliary programs; and
an operating system separate from the one or more auxiliary programs;
wherein the BIOS comprises:
one or more instructions for causing the one or more processors to save a subset of a set of environmental settings, wherein the environmental settings define a current environment for the computer;
one or more instructions for causing the one or more processors to execute one or more of the auxiliary programs, thereby causing control to be transferred to one or more of the auxiliary programs;
one or more instructions for causing the one or more processors to restore the subset of environmental settings, wherein the subset of environmental settings is restored after the BIOS regains control from the one or more auxiliary programs; and
one or more instructions for causing the one or more processors to execute the operating system, thereby causing control to be transferred to the operating system; and
wherein the one or more auxiliary programs comprise:
one or more instructions for causing the one or more processors to save a remainder of the set of environmental settings;
one or more instructions for causing the one or more processors to restore the remainder of the set of environmental settings; and
one or more instructions for causing the one or more processors to execute the BIOS, thereby causing control to be transferred back to the BIOS.

54. A computer readable medium, comprising:
a basic input-output system (BIOS); and
one or more auxiliary programs;

wherein the BIOS comprises:
  one or more instructions for causing one or more processors to save a subset of a set of environmental settings, wherein the environmental settings define a current environment for a computer in which the computer readable medium resides;
  one or more instructions for causing one or more processors to execute one or more of the auxiliary programs, thereby causing control to be transferred to one or more of the auxiliary programs;
  one or more instructions for causing one or more processors to restore the subset of environmental settings, wherein the subset of environmental settings is restored after the BIOS regains control from the one or more auxiliary programs; and
  one or more instructions for causing one or more processors to execute an operating system separate from the one or more auxiliary programs, thereby causing control to be transferred to the operating system; and
wherein the one or more auxiliary programs comprise:
  one or more instructions for causing one or more processors to save a remainder of the set of environmental settings;
  one or more instructions for causing one or more processors to restore the remainder of the set of environmental settings; and
  one or more instructions for causing one or more processors to execute the BIOS, thereby causing control to be transferred back to the BIOS.

* * * * *